US012437606B2

(12) United States Patent
Camelio et al.

(10) Patent No.: US 12,437,606 B2
(45) Date of Patent: Oct. 7, 2025

(54) VIRTUAL ELECTRONIC GAMING SYSTEMS AND METHODS

(71) Applicant: Aristocrat Technologies, Inc., Las Vegas, NV (US)

(72) Inventors: Mary Camelio, Coweta, OK (US); David Gilliam, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 267 days.

(21) Appl. No.: 18/457,082

(22) Filed: Aug. 28, 2023

(65) Prior Publication Data

US 2024/0096164 A1 Mar. 21, 2024

Related U.S. Application Data

(60) Provisional application No. 63/375,029, filed on Sep. 8, 2022.

(51) Int. Cl.
*G07F 17/00* (2006.01)
*G07F 17/32* (2006.01)

(52) U.S. Cl.
CPC ...... *G07F 17/3213* (2013.01); *G07F 17/3258* (2013.01); *G07F 17/3267* (2013.01)

(58) Field of Classification Search
None
See application file for complete search history.

(56) References Cited

U.S. PATENT DOCUMENTS

| | | | | | |
|---|---|---|---|---|---|
| 6,135,885 | A * | 10/2000 | Lermusiaux | G07F 17/32 | 463/16 |
| 6,375,568 | B1 | 4/2002 | Roffman | | |
| 6,893,344 | B2 * | 5/2005 | Brown | G07F 17/32 | 463/20 |
| 8,517,810 | B2 * | 8/2013 | Vann | G07F 17/3232 | 463/16 |
| 2004/0102238 | A1 | 5/2004 | Taylor | | |
| 2004/0176157 | A1 * | 9/2004 | Walker | G07F 17/3262 | 463/16 |
| 2005/0282612 | A1 | 12/2005 | Mathews | | |
| 2013/0035150 | A1 * | 2/2013 | Owen | G07F 17/3265 | 463/20 |
| 2014/0370961 | A1 * | 12/2014 | Elias | G07F 17/3267 | 463/20 |
| 2016/0171835 | A1 * | 6/2016 | Washington | G07F 17/3223 | 463/25 |
| 2017/0084129 | A1 * | 3/2017 | Baerlocher | G07F 17/3211 | |
| 2020/0226884 | A1 * | 7/2020 | Grotte | G07F 17/34 | |

* cited by examiner

*Primary Examiner* — Paul A D'Agostino
(74) *Attorney, Agent, or Firm* — Armstrong Teasdale LLP

(57) ABSTRACT

An electronic gaming device including a memory and a processor is described. The processor is configured to initiate an electronic game including a number of spins and a segmented path including a number of segments and, for each respective spin of the number of spins, i) decrement a number of spins remaining, ii) determine an output amount for the respective spin, iii) determine, for the respective spin, an amount of progress across the segmented path, iv) cause the amount of progress to be displayed, v) determine whether a first threshold of progress across the segmented path has been satisfied, and vi) determine whether a second threshold of progress across the segmented path has been satisfied.

20 Claims, 10 Drawing Sheets

VIRTUAL ELECTRONIC GAMING SYSTEMS AND METHODS

CROSS REFERENCE TO RELATED APPLICATIONS

This application claims the benefit of priority to U.S. Provisional Patent Application No. 63/375,029, filed Sep. 8, 2022, which is hereby incorporated by reference herein in its entirety.

TECHNICAL FIELD

The field of disclosure relates generally to electronic gaming, and more specifically, to virtual electronic gaming systems and methods.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, an electronic gaming device including at least one memory with instructions stored thereon and at least one processor in communication with the at least one memory is described. The instructions, when executed by the at least one processor, cause the at least one processor to initiate an electronic game including a number of spins and a segmented path including a number of segments and, for each respective spin of the number of spins, i) decrement a number of spins remaining, ii) determine an output amount for the respective spin wherein the output amount is associated with any of a first subset of symbols being displayed for the respective spin and wherein each symbol of the first subset of symbols is associated with a number for contribution to the output amount, iii) determine, for the respective spin, an amount of progress across the segmented path displayed by the electronic gaming device wherein the amount of progress is associated with any of a second subset of symbols being displayed for the respective spin and wherein each symbol of the second subset of symbols is associated with at least a portion of progress for contribution to the amount of progress, iv) cause the amount of progress to be displayed, v) determine whether a first threshold of progress across the segmented path has been satisfied wherein the first threshold of progress being satisfied causes the number of spins remaining to be reset to the number of spins, and vi) determine whether a second threshold of progress across the segmented path has been satisfied wherein the second threshold of progress being satisfied causes a randomly determined bonus output to be presented.

In another aspect, at least one non-transitory computer-readable storage medium with instructions stored is described. The instructions, in response to execution by at least one processor, cause the at least one processor to cause an electronic game including a number of spins and a segmented path including a number of segments to be initiated on an electronic gaming device and, for each respective spin of the number of spins, i) cause a number of spins remaining to be decremented, ii) determine an output amount for the respective spin wherein the output amount is associated with any of a first subset of symbols being displayed for the respective spin and wherein each symbol of the first subset of symbols is associated with a number for contribution to the output amount, iii) determine, for the respective spin, an amount of progress across the segmented path displayed by the electronic gaming device wherein the amount of progress is associated with any of a second subset of symbols being displayed for the respective spin and wherein each symbol of the second subset of symbols is associated with at least a portion of progress for contribution to the amount of progress, iv) cause the amount of progress to be displayed, v) determine whether a first threshold of progress across the segmented path has been satisfied wherein the first threshold of progress being satisfied causes the number of spins remaining to be reset to the number of spins, and vi) determine whether a second threshold of progress across the segmented path has been satisfied wherein the second threshold of progress being satisfied causes a randomly determined bonus output to be presented.

In another aspect, a method of electronic gaming implemented by at least one processor in communication with at least one memory is described. The method includes initiating an electronic game including a number of spins and a segmented path including a number of segments on an electronic gaming device and, for each respective spin of the number of spins, i) decrementing a number of spins remaining, ii) determining an output amount for the respective spin wherein the output amount is associated with any of a first subset of symbols being displayed for the respective spin and wherein each symbol of the first subset of symbols is associated with a number for contribution to the output amount, iii) determining, for the respective spin, an amount of progress across the segmented path displayed by the electronic gaming device wherein the amount of progress is associated with any of a second subset of symbols being displayed for the respective spin and wherein each symbol of the second subset of symbols is associated with at least a portion of progress for contribution to the amount of progress, iv) causing the amount of progress to be displayed, v) determining whether a first threshold of progress across the segmented path has been satisfied wherein the first threshold of progress being satisfied causes the number of spins remaining to be reset to the number of spins, and vi) determining whether a second threshold of progress across the segmented path has been satisfied wherein the second threshold of progress being satisfied causes a randomly determined bonus output to be presented.

DETAILED DESCRIPTION

Figure 1:
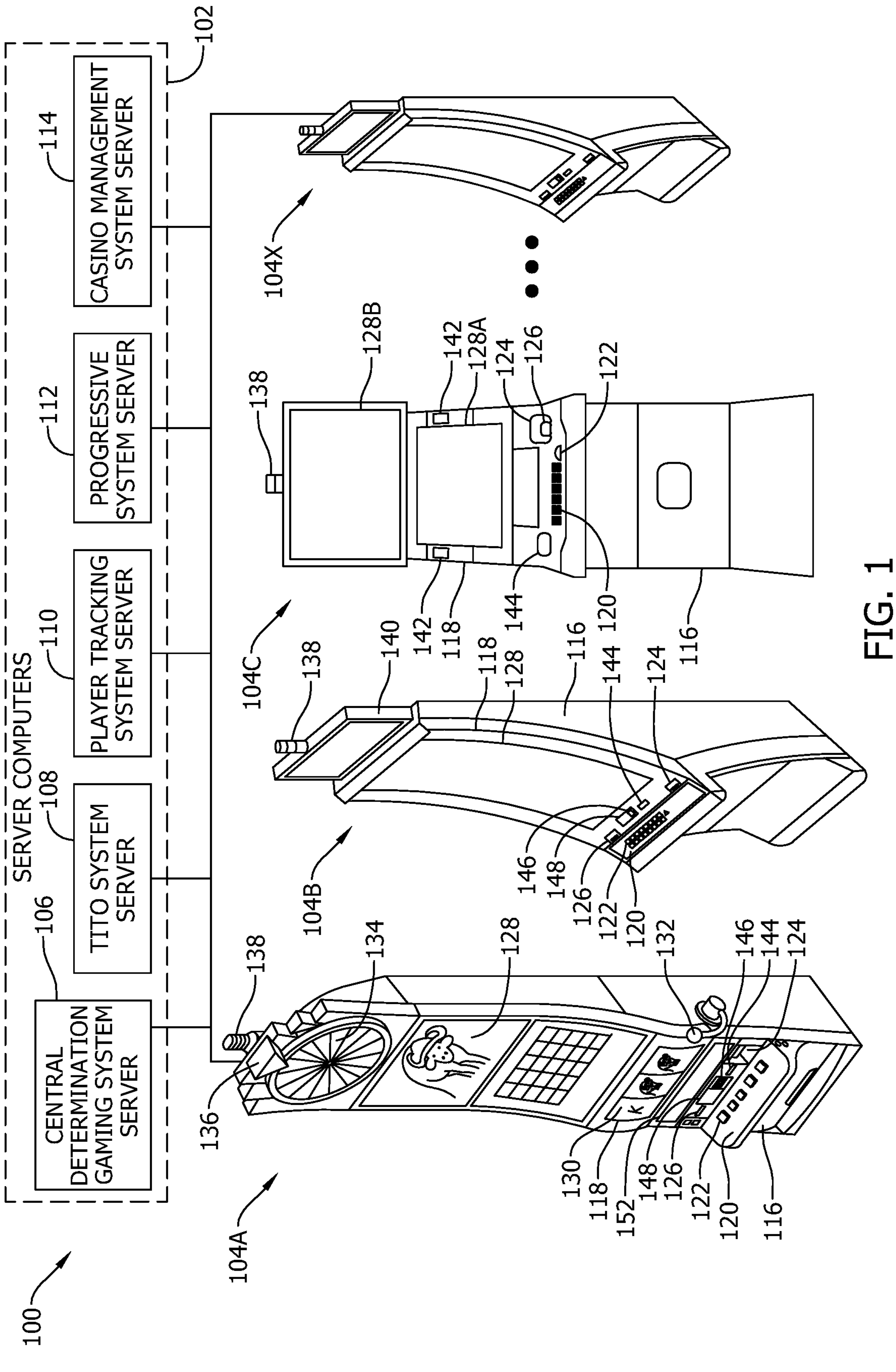
FIG. 1 is an exemplary diagram showing several EGMs networked with various gaming related servers.

Described herein are virtual electronic gaming systems and methods that are played at electronic gaming devices (e.g., mobile computing devices, casino-based devices, etc.). In one example embodiment, the virtual games include virtual football games (e.g., football game simulations, fantasy football embodiments, etc.). For example, in some embodiments, a base game is played that involves spinning reels displayed on a gaming device wherein a bonus game may be triggered as part of the base game. The bonus game may include a football game simulation in combination with a number of spins that are triggered from the base game. Different game outcomes in the bonus game (e.g., associated with reel spins and/or certain symbols, such as cash on reel (COR) symbols with credit amounts displayed thereon) may be converted into a number of yards a team advances down a virtual field displayed on a display device of the gaming device. Some COR symbols may display advancement amounts (e.g., yard amounts) thereon that correspond to an amount to advance down the virtual field. Each "first down" (e.g., advancement of 10 yards) may result in a number of free spins for the bonus game being reset. The team reaching the end of the field (e.g., scoring a touchdown) results in a prize being awarded to the player.

The technical problems addressed herein include at least one of: (i) inability of known systems to convert credit amounts into other amounts for an electronic game; (ii) inability of known systems to provide advancement animations across a segmented path to illustrate progress in an electronic game; (iii) inability of known systems to receive player selections associated with advancement amounts across a segmented path; (iv) inability of known systems to utilize player-specific virtual players and/or teams in electronic gaming; (v) inability of known systems to utilize player and/or team performance in determining outcomes for electronic games associated with virtual versions of the player and/or team; and (vi) inability of known systems to implement single-player and multiplayer options in an electronic game that utilizes player and/or team performance in determining outcomes associated with virtual versions of the player and/or team.

The resulting technical effect and/or technical benefits achieved herein include at least one of: (i) ability to convert credit amounts into other amounts (e.g., virtual yard advancement amounts) for an electronic game (e.g., based on one or more lookup tables used for conversions); (ii) ability to provide advancement animations across a segmented path (e.g., virtual football field) to illustrate progress in an electronic game; (iii) ability to receive player selections associated with advancement amounts (e.g., selection of different plays associated with different random amounts of virtual yards) across a segmented path; (iv) ability to utilize player-specific virtual players and/or teams in electronic gaming (e.g., player-favorite teams and/or fantasy football teams); (v) ability to utilize player and/or team performance in determining outcomes for electronic games associated with virtual versions of the player and/or team (e.g., real-life performance of a team and/or player may affect electronic game outcomes where virtual versions of that team and/or player are utilized—strong player and/or team performance in real-life football games, for example, may directly correlate to increased RTP in games including virtual versions of those players and/or teams, while weak player and/or team performance in real-life football games, for example, may directly correlate to decreased RTP); and (vi) ability to implement single-player and multiplayer options in an electronic game that utilizes player and/or team performance in determining outcomes associated with virtual versions of the player and/or team (e.g., single-player and multiplayer game options may both be affected by real-life performance of teams and/or players).

In some embodiments, a prize ladder (e.g., with a plurality of prizes displayed thereon) may be provided with prize awards increasing up the ladder. Play of the bonus game may begin with the prize at the bottom of the ladder being associated with the bonus game, and with each score the prize associated with the bonus game moves one spot (or more) up the ladder. When play of the bonus game ends (e.g., the number of free spins reaches zero, a touchdown is achieved, etc.), a prize associated with a current position on the ladder (e.g., or a random unlocked prize on the ladder) is presented to the player.

In other words, in at least one embodiment, a bonus game with a number of spins is initiated based on determining that a trigger condition is satisfied as part of the base game. Then, for each free spin of the number of free spins, the number of free spins is decremented and an amount of progression (or virtual distance) across a segmented path (e.g., a virtual football field) is determined wherein advancement across at least one segment (e.g., every ten yards of the virtual football field) of the segmented path results in resetting a number of remaining free spins to the number of free spins, and wherein advancement to an end of the segmented path (e.g., an endzone) results in an output amount being presented or awarded to the player.

In some embodiments, the virtual games include a fantasy football themed game. Players can link their fantasy football team information to the virtual game (e.g., by carding in and data being provided from a player tracking server and/or data being transmitted from an end user device). Virtual players may be provided that are associated with the fantasy football team information (e.g., animations and graphics associated with likenesses of the virtual players may be displayed). Virtual players may also be selected and/or earned during play of the game (e.g., the player may be awarded points they can use to select additional and/or alternative virtual players). In some embodiments, selections of virtual players are available based on skillset (e.g., with better and/or more popular virtual players being available for more points) and/or certain virtual players may be provided randomly (e.g., during a bonus round).

In some embodiments, a player may select a choice of offense or defense. In some embodiments, a player may be associated with just offense. In some embodiments head-to-head play against other players may be provided. Game outcomes in the virtual football game may be provided based on electronic game outcomes (e.g., slot game outcomes). For example, a pass play in the virtual football field may be provided when a football symbol appears in a first reel and a quarterback symbol appears in a fifth reel. As another example, a field goal attempt may be provided when a football symbol appears in a first reel and a field goal symbol appears in a fifth reel.

Play outcomes (e.g., pass play, run play, field goal, etc.) may be randomly determined (e.g., based on RNG outcomes and different lookup tables for the different play types). In some embodiments, players may be able to provide inputs to alter the play outcomes (e.g., selection of run play or pass play, selection of which receiver to throw to, etc.). In some embodiments, outcomes of the football game may be associated with jackpots that may be presented and/or leaderboards displayed across connected gaming devices. In some embodiments, outcomes are randomly replayed (e.g., re-awarded). For example, when an outcome is re-awarded an animation associated with the outcome (e.g., a player scoring a touchdown) may be replayed on a gaming device where the outcome was re-awarded as well as a community display (e.g., above the gaming device or elsewhere in a gaming establishment) to indicate that the replay occurred to other patrons.

In other words, a plurality of virtual characters for an electronic game are identified. A game outcome is then displayed in a first display area of a display device. Satisfaction of a trigger condition is determined based on the game outcome and a plurality of selectable actions (e.g., pass play, run play, etc.) associated with the plurality of virtual characters are displayed. A selection of a selectable action of the plurality of selectable actions is received and an action outcome associated with the selectable action is randomly determined. At least one virtual character of the plurality of virtual characters is displayed in a second display area as performing the selectable action in accordance with the action outcome and an output amount is provided to a player account based at least in part upon the action outcome.

In the example embodiment, an electronic gaming system is provided that initiates an electronic game including a number of spins and a segmented path including a number of segments (e.g., a football field). The electronic gaming system is also configured to, for each respective spin of the number of spins, decrement a number of spins remaining and determine an output amount for the respective spin wherein the output amount is associated with any of a first subset of symbols being displayed for the respective spin, and wherein each symbol of the first subset of symbols is associated with a number for contribution to the output amount.

The electronic gaming system is also configured to, for each respective spin of the number of spins, determine, for the respective spin, an amount of progress across the segmented path displayed by the electronic gaming device wherein the amount of progress is associated with any of a second subset of symbols being displayed for the respective spin and wherein each symbol of the second subset of symbols is associated with at least a portion of progress for contribution to the amount of progress (e.g., an amount of yards to advance). The electronic gaming system is also configured to cause the amount of progress to be displayed (e.g., a ball or players advancing down the field).

The electronic gaming system is further configured to, for each respective spin of the number of spins, determine whether a first threshold of progress across the segmented path has been satisfied (e.g., a first down, or 10 yards) wherein the first threshold of progress being satisfied causes the number of spins remaining to be reset to the number of spins and determine whether a second threshold of progress across the segmented path has been satisfied (e.g., crossing the goal line for a touchdown) wherein the second threshold of progress being satisfied causes a randomly determined bonus output to be presented.

In some embodiments, the first threshold of progress is associated with completion of a segment of the number of segments, and the electronic gaming system is further configured to cause display of a needed amount of progress to complete the segment of the number of segments (e.g., 3 yards to go, 7 yards to go, etc.).

In some embodiments, the second threshold of progress includes completing the segmented path, and the electronic gaming system is configured to randomly determine, upon the second threshold of progress being completed, whether to reset the number of spins remaining to the number of spins and reset progress made on the segmented path (e.g., provide an additional "drive").

In some embodiments, the electronic gaming system is configured to cause the randomly determined bonus output to be presented wherein the randomly determined bonus output is eligible to include a feature output (e.g., Grand jackpot) that is otherwise ineligible to be presented during the electronic game. In some embodiments, the electronic gaming system is further configured to cause display of the randomly determined bonus output as a result of a spin of a bonus wheel that is displayed by the electronic gaming device.

In some embodiments, the electronic gaming system is configured to receive an input associated with a theme of the electronic game (e.g., selection of a team), identify at least one of visual effects or audio effects associated with the theme, and present at least a portion of the at least one of the visual effects or the audio effects during the electronic game. In some embodiments, the electronic gaming system is configured to cause display of a graphic associated with the number of free spins remaining in a display area of the electronic gaming device (e.g., $1^{st}$ down means four spins remaining, $2^{nd}$ down means three spins remaining, etc.).

In some embodiments, the electronic gaming system is configured to, for at least one spin of the number of spins, cause display of a plurality of potential advancement options (e.g., different football plays) wherein each potential advancement option of the plurality of potential advancement options is associated with a randomly determined amount of progress across the segmented path, receive a selection of a potential advancement option of the plurality of potential advancement options, and cause the randomly determined amount of progress across the segmented path associated with the selection to be provided.

The description provided herein includes certain examples and exemplary use cases. It should be understood that these examples and use cases are included herein for illustrative purposes, and these examples and use cases should not be taken to limit the present disclosure. The systems and methods described herein may be used in many other use cases.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat ° Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
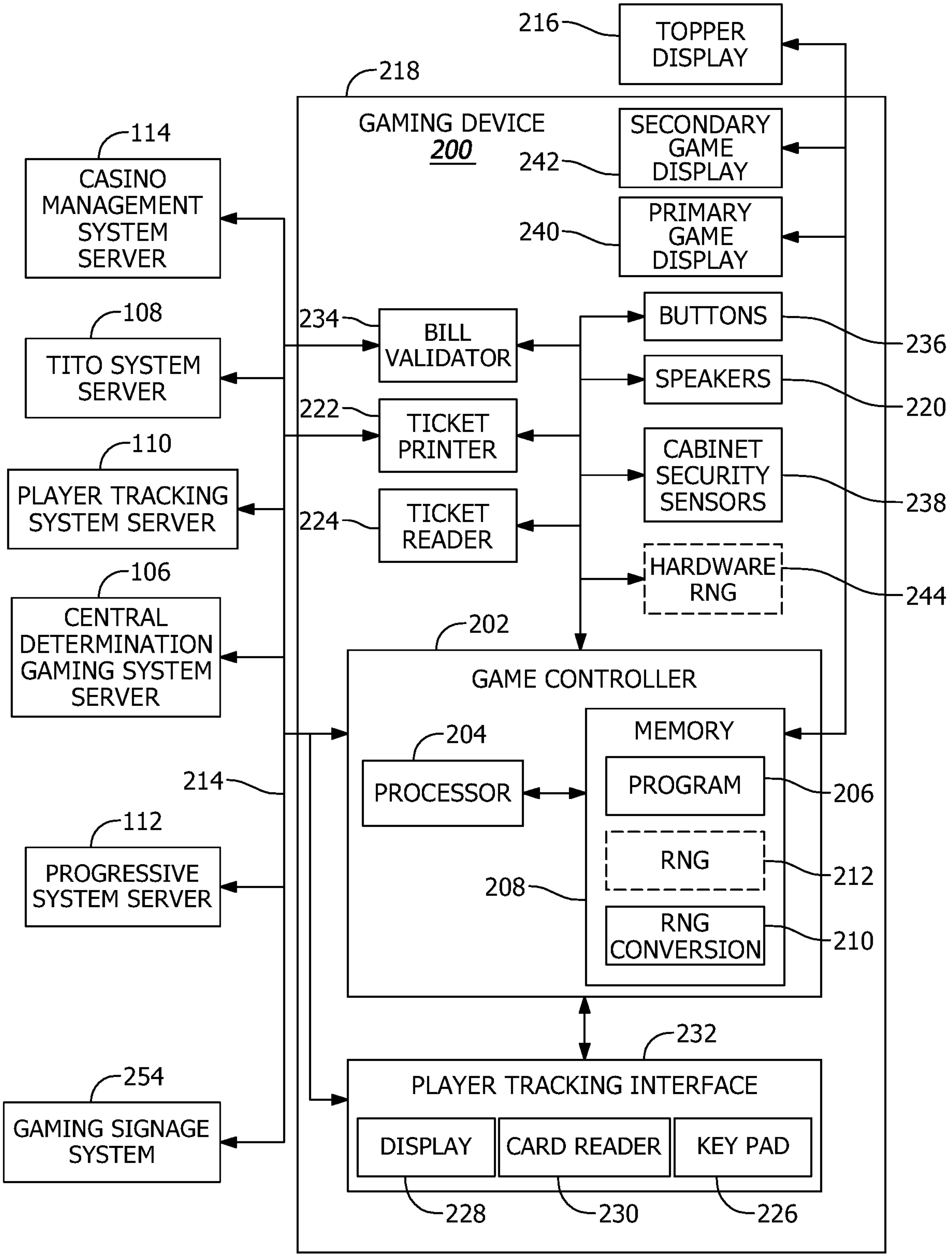
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat ° Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat ° Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optic al discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS ° system manufactured by Aristocrat ° Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
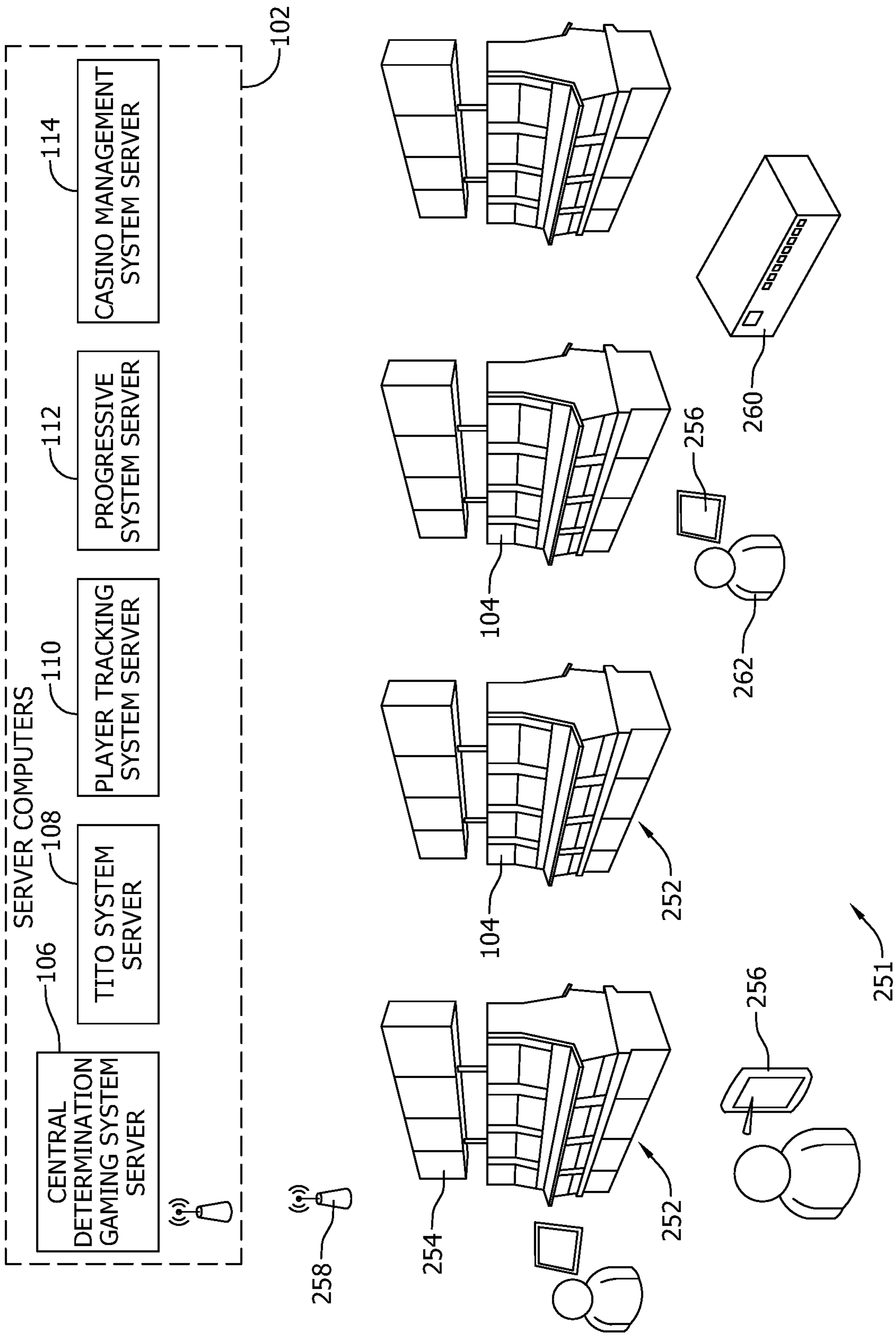
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor (s) to verify the identity of an authorized patron. Some mobile gaming devices 256 may be configured to function only within a predetermined or configurable area, such as a casino gaming area.

Figure 2C:
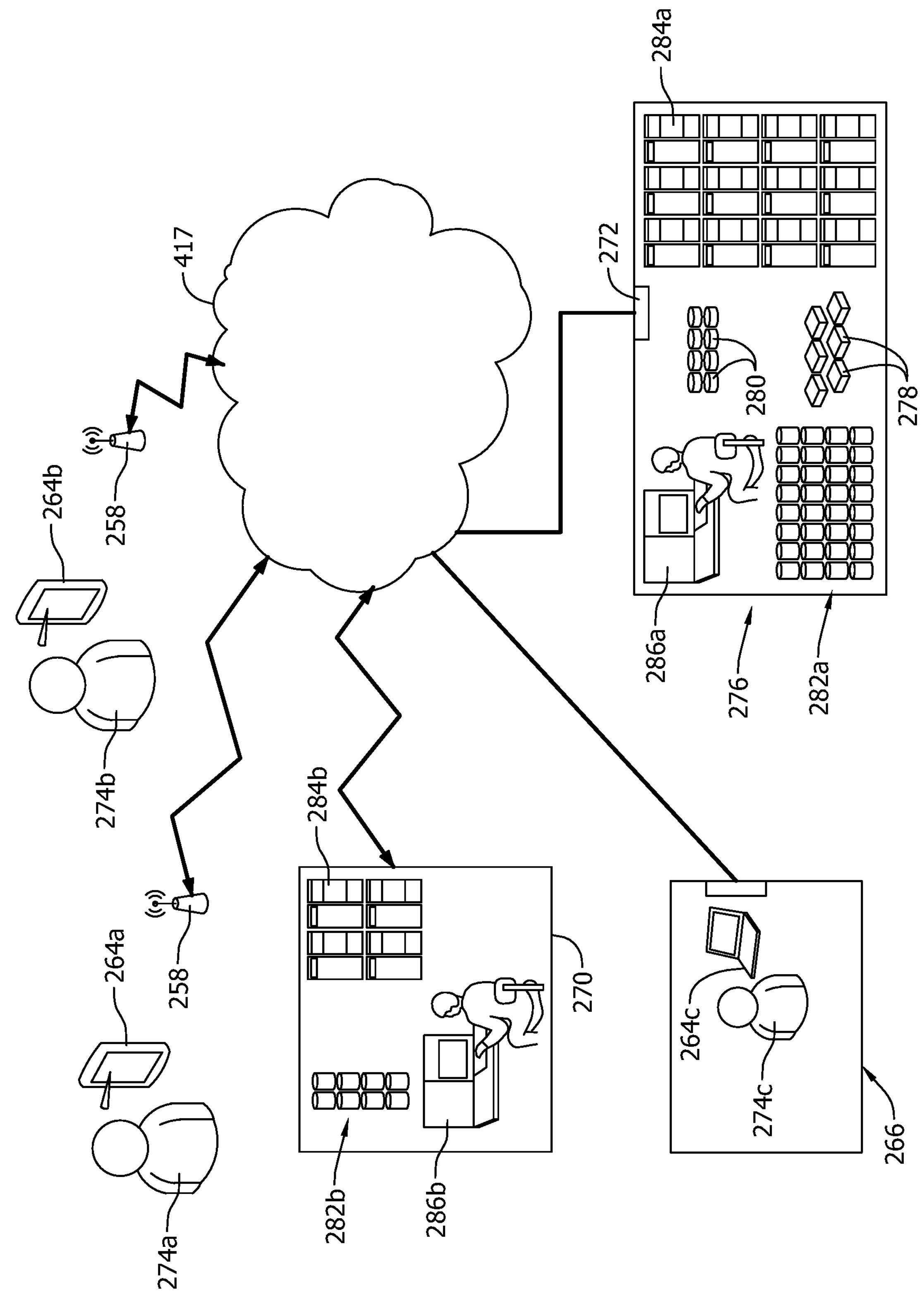
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server (s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
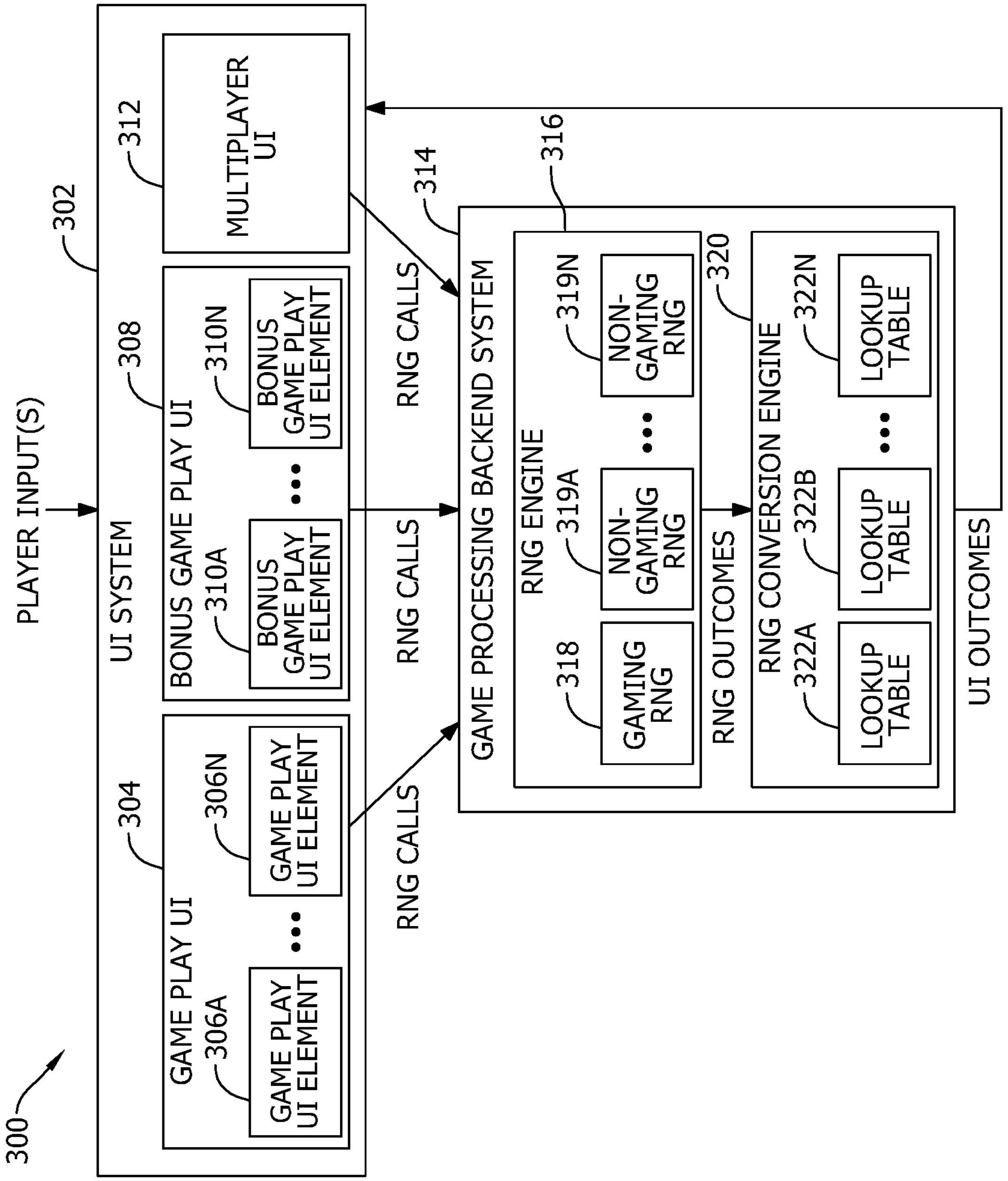
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
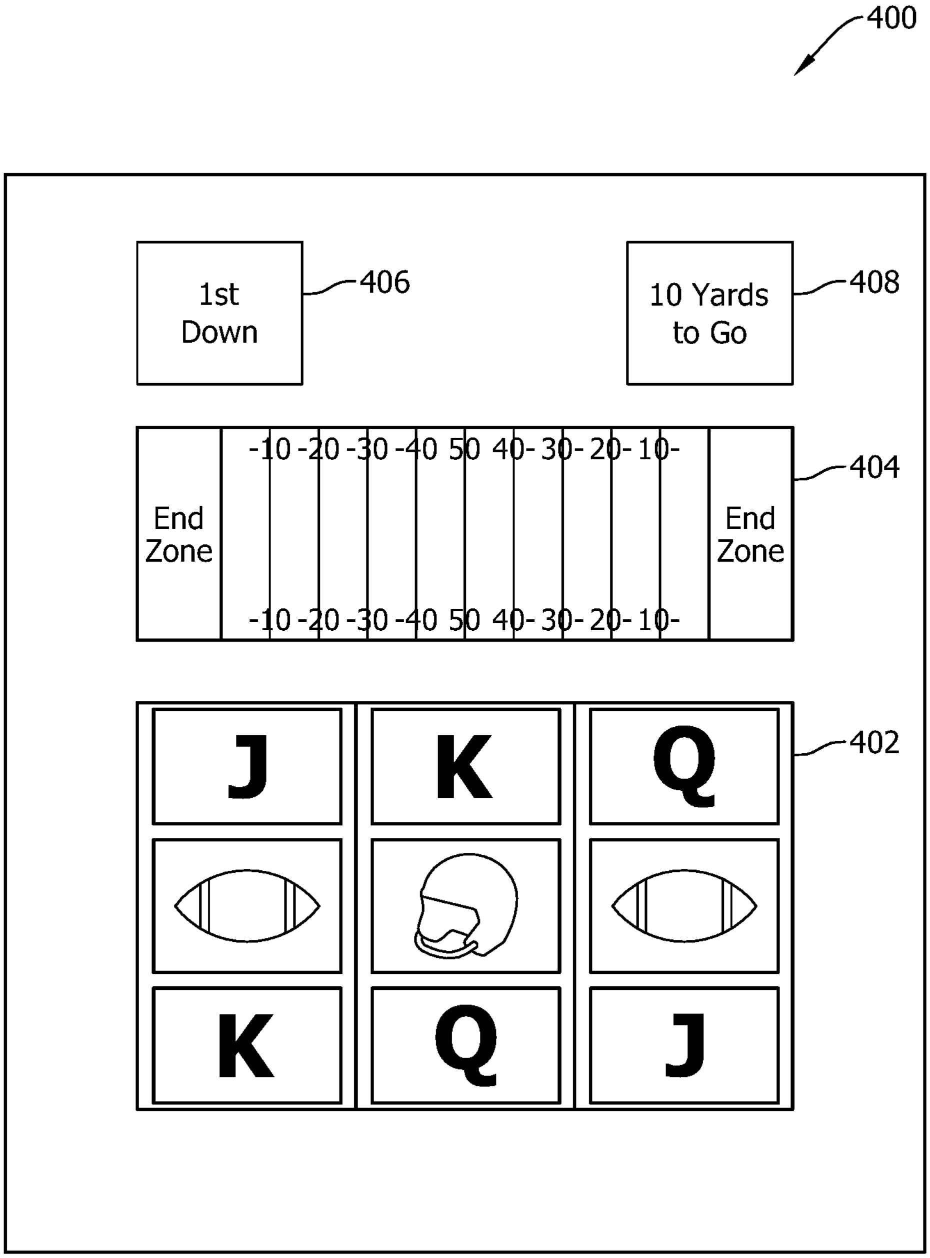
FIG. 4 illustrates an example embodiment of virtual electronic gaming, in accordance with the present disclosure.

FIG. 4 illustrates an example embodiment of virtual electronic gaming, as implemented by any of the gaming devices (e.g., 104A-X, 200, 256, 264*a*-*c*), systems, and/or architectures described herein. For example, as shown in FIG. 4, a display screen 400 includes a reel display area 402, a field display area 404, a down display area 406, and a yards to go display area 408.

Reel display area 402 is configured to display electronic game outcomes on a plurality of reels, or other game elements as described herein. Field display area 404 includes a virtual football field (e.g., with virtual football players thereon). In some embodiments, virtual football players act out play outcomes associated with/provided based in part on the electronic game displayed in area 402. Down display area 406 includes a number of "downs" to go in a bonus game where four free spins are initially provided (e.g., the number of downs remaining may increase from $1^{st}$ down, to $2^{nd}$ down, to $3^{rd}$ down, and to $4^{th}$ down, wherein each down corresponds to one reel spin and a football play corresponding to the reel spin). As is the case with a game of football, if ten yards have not been reached by the end of $4^{th}$ down, the example bonus game may end. If ten yards are reached before the end of $4^{th}$ down, display area 406 is reset back to $1^{st}$ down (e.g., providing a new set of downs), and a number of spins for a bonus game are reset to four. A number of yards remaining until a new $1^{st}$ down is achieved is displayed in yards to go display area 408.

As an example, reel display area 402 may include a 5×4 reel video slot featuring a football theme (e.g., that potentially awards Minor, Major, and Grand jackpots). At the beginning of a gaming session, a player may select their favorite team, or team's colors. Certain symbols and/or colors displayed may be modified according to the player selection (e.g., colors associated with the team may be displayed instead of default colors). Further examples of team-specific features include team fight songs and team animations (e.g., team-specific touchdown celebration animations).

During play of a base slot game, if a number of trigger symbols (e.g., footballs, team helmets, cash on reel (COR) symbols with output amounts displayed thereon, etc.) land during base game play, a free game feature is triggered (e.g., wherein paid spins are not required, rather the spins are provided for free). In some embodiments, COR symbols may be "held" in their respective symbol positions upon triggering the bonus game and persist throughout at least a portion of the bonus game.

For example, COR symbols held from the base game into the bonus game may be associated with yard amounts, and the amount of yards on the COR symbols held into the bonus game may correspond to a starting point (e.g., beginning line of scrimmage). For instance, if 30 yards of COR symbols are held into the bonus game, play of the football aspect of the bonus game may begin 70 yards away from the end zone (e.g., because 30 yards of progress have already been achieved). Further, COR symbols may be associated with credit amounts. This way, even if no COR symbols with yard amounts displayed thereon are presented (e.g., and there is no advancement down the field) for a particular spin, credit amounts from the COR symbols displaying credit amounts can be provided.

In other words, COR symbols can have credit values displayed thereon, yards gained values displayed thereon, or both. For example, yard amounts may be secondary amounts indicated on some or all COR symbols with credit values displayed thereon (e.g., as primary amounts).

In some embodiments, upon triggering the feature game, virtual players associated with a player-selected favorite team may be displayed in field display area 404. Four free spins may initially be provided (e.g., corresponding to four downs in football). Each first down achieved by the team may move an indicator up a prize ladder. The team failing to get a first down ends the bonus game and advancement on the prize ladder. When advancement on the prize ladder is stopped and the bonus game ends (e.g., or a touchdown is achieved), an award associated with a current position on the ladder is presented. Certain input amounts may unlock different eligible prizes/areas in the ladder. For example, a threshold input amount may be required to unlock eligibility to win a "Grand" prize.

In order to advance down the field (e.g., and achieve first downs and/or touchdowns), football play outcomes may be determined based on reel outcomes. For example, certain symbols may be associated with certain amounts of advancement down the field. As one example, certain symbols may display a number of yards thereon. In some embodiments, COR symbols may have credit values thereon converted to a number of yards of advancement. In some embodiments, COR symbols may have a credit value thereon and a sub-symbol indicating an amount of yards that will be advanced. In some embodiments, certain COR symbols may display yard amounts and some COR symbols may display credit amounts. In some embodiments, COR symbols are held (e.g., persistently displayed) until a first down or touchdown is achieved.

In some embodiments, upon advancement into the "red zone" (e.g., within the 20 yard line on either side of the field), an animation may be displayed in bright red (e.g., a banner above area 404) indicating that the team is close to scoring (e.g., is within 20 yards of the end zone). In some embodiments, different sounds may be outputted as advancement down the field occurs (e.g., cheering for positive plays, booing for negative plays, etc.).

In some embodiments, certain triggers in a slot game outcome in area 402 (e.g., or other determination such as a separate random determination) may trigger special virtual plays in field display area 404 (e.g., during a base game or bonus game). For example, certain triggers may result in an interception in the football game where one team intercepts the ball (e.g., and may or may not score during the interception). In some embodiments, when an interception occurs, a sound output of a referee whistle may be outputted to indicate to a player that an interception has occurred. Upon a team associated with a player of a gaming device achieving an interception, the intercepting team may score a touchdown (e.g., resulting in presentation of a first bonus such as a Major jackpot) or the intercepting team may stop short of a displayed end zone and attempt a field goal (e.g., of which the outcome is determined randomly, and if the field goal attempt is successful, a second bonus such as a Minor jackpot is presented).

In the example embodiment, a bonus game that includes a football game simulation (e.g., at area 404) and a number of spins (e.g., at area 402) is triggered. Different game outcomes in the bonus game (e.g., associated with reel spins) may be converted into a number of yards a team advances down a virtual field. Each "first down" (e.g., advancement of 10 yards) may result in a number of free spins for the bonus game being reset (e.g., a number of spins and area 406 are reset). The team reaching the end of the field (e.g., scoring a touchdown) results in a prize being awarded. In some embodiments, the bonus game may be reset upon the scoring of a touchdown such that multiple touchdowns may be scored in the same bonus game. In such embodiments, output amounts may increase as the number of touchdowns scored increase. In some embodiments, an amount of plays and/or yards required to score a touchdown may affect the output amount. For example, travelling more yards in less plays may be associated with a higher output amount than travelling those yards in more plays and/or travelling less yards.

In the example embodiment, different sounds may be outputted based on events/plays occurring in the bonus game (e.g., "First Down," "Touchdown," etc.).

In some embodiments, a prize ladder (e.g., with a plurality of prizes, such as jackpots, displayed thereon) may be provided with prize awards increasing up the ladder. Play of the bonus game may begin with the prize at the bottom of the ladder being associated with the bonus game, and with each score the prize associated with the bonus game moves one spot up the ladder. When play of the bonus game ends (e.g., the number of free spins reaches zero), a prize associated with a current position (e.g., or other randomly determined prized that is unlocked) on the ladder is presented.

In some embodiments, the random determination of which prize to award may be presented as a spin of a virtual wheel with all "unlocked" or achieved prizes on the ladder being displayed on the wheel. In some embodiments, certain prizes may only be eligible to be won if a threshold input amount (e.g., wager) is provided. For example, a "Grand" prize may only be eligible to be presented if a threshold input amount is provided (e.g., or other trigger condition being satisfied such as a number of points being scored or a touchdown being achieved). A football-themed animation, such as a player spiking a football, may be displayed as causing the wheel to spin.

In some embodiments, after a touchdown is achieved, another "drive" (e.g., a new set of spins and reset to predetermined position on the field) may be provided. For example, in some embodiments (e.g., Class 2 embodiments) a number of points to be provided to the player across a number of drives may be determined and different outcomes of different drives (e.g., touchdown, field goal, turnover, etc.) may be provided in a single play of the bonus game.

In some embodiments, in order to display if a new drive will be presented or not, a defensive sequence (e.g., including a number of defensive plays) may be displayed to the player. For example, a random determination of whether or not a new drive will be presented is made. If a new drive will be presented, the defensive sequence displayed may show the defense getting the ball back from the other team in order to start a new drive. If no new drive will be presented, the defensive sequence may show the defense giving up a score to the other team. In some embodiments, a kickoff play animation may be used to show whether or not another drive will be presented (e.g., based on the outcome of the kick return in the kickoff play).

In some embodiments, upon the occurrence of a trigger condition (e.g., a final spin), the player may be provided with different options for how to proceed in the bonus game. For example, the player may be provided with the option to kick a field goal (e.g., and have a relatively higher chance at a smaller prize, based on a lookup table specific to field goals) or "go for it" to try to achieve a first down or touchdown (e.g., a relatively lower chance at a higher prize, based on a lookup table different from the field goal lookup table), with the risk that not making the first down or touchdown will end the bonus game.

In other words, a bonus game with a number of spins is initiated based on determining that a trigger condition is satisfied. Then, for each free spin of the number of free spins, the number of free spins is decremented and an amount of progression across a segmented path (e.g., a football field in area 404) is determined, wherein advancement across at least one segment of the segmented path results in resetting a number of remaining free spins to the number of free spins, and wherein advancement to an end of the segmented path results (e.g., an end zone of the field in area 404) in an output amount being presented.

Figure 5:
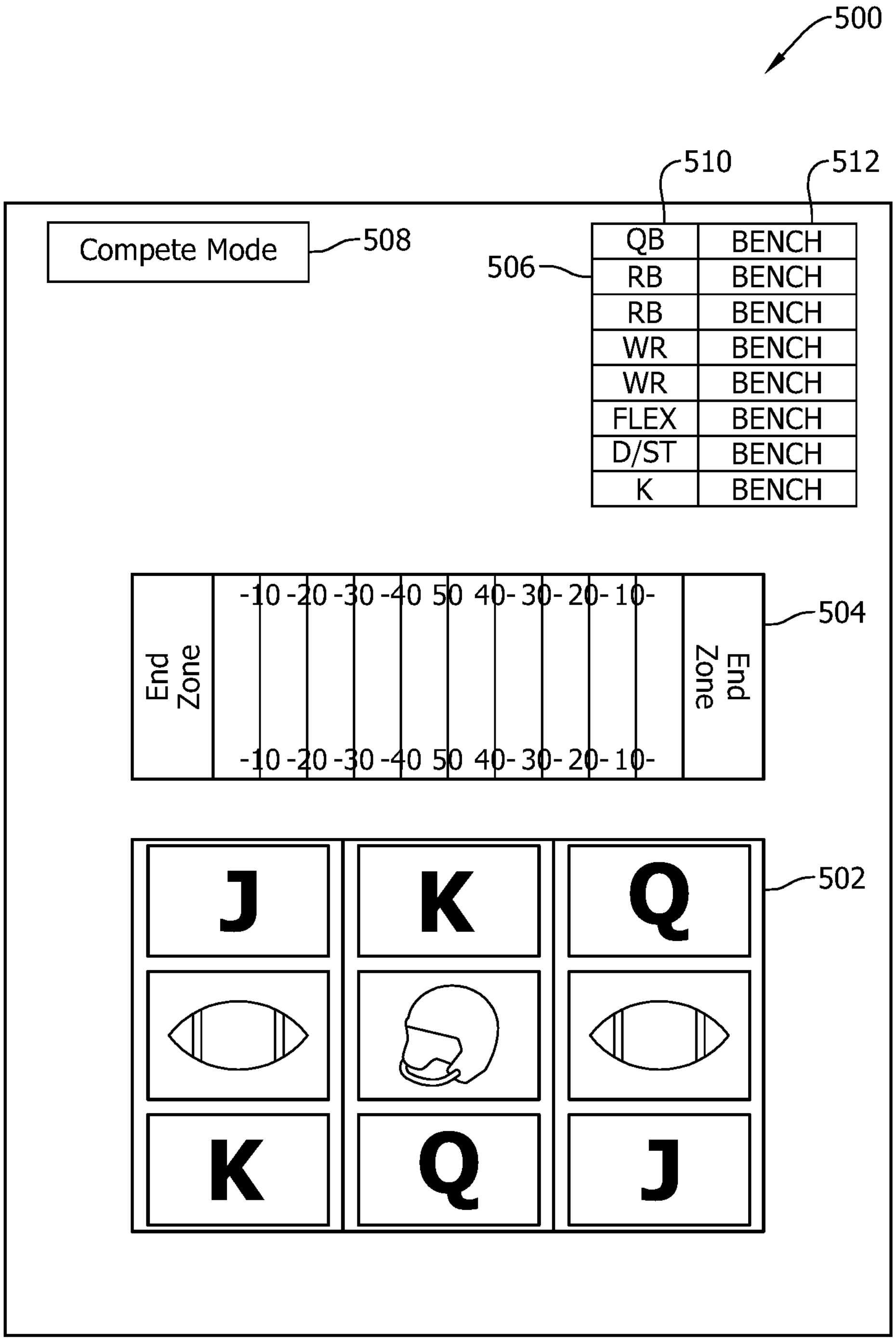
FIG. 5 illustrates another example embodiment of virtual electronic gaming, in accordance with the present disclosure.

FIG. 5 illustrates another example embodiment of virtual electronic gaming, as implemented by any of the gaming devices (e.g., 104A-X, 200, 256, 264*a-c*), systems, and/or architectures described herein. For example, as shown in FIG. 5, a display screen 500 includes a reel display area 502, a field display area 504, a team display area 506, and a mode display area 508.

Reel display area 502 is configured to display electronic game outcomes on a plurality of reels, or other game elements as described herein. Field display area 504 includes a virtual football field (e.g., with virtual football players thereon). In some embodiments, virtual football players act out play outcomes associated with/provided based in part on the electronic game displayed in area 502. Team display area 506 includes virtual football players associated with a bonus game (e.g., associated with real professional football players or virtual football players, as examples). Mode display area 508 indicates which of a plurality of game modes are currently being played (e.g., compete or basic).

For example, in some embodiments, a fantasy football themed game is provided. Players can link their fantasy football team information to the game (e.g., by carding in and data being provided from player tracking server 110 and/or data being transmitted from a player device such as an end user device). In some embodiments, virtual football players may be randomly selected. Virtual football players may be provided in area 506 that are associated with the fantasy football team information. In some embodiments, game outcomes may affect outcomes in fantasy football game tracked by a backend server (e.g., player tracking server 110). For example, a fantasy football team associated with a player may earn points in a traditional fantasy football manner (e.g., based on football game outcomes) and game outcomes on a gaming device (e.g., game outcomes on a gaming device may increase a number of points scored for the fantasy football team). In some embodiments, performance by a player in a fantasy football game (e.g., not provided by the gaming device where the example game is displayed) may affect the game provided by the gaming device.

Additional and/or alternative virtual football players may also be selected and/or earned during play of the game (e.g., the player may be awarded points they can use to select additional and/or alternative virtual football players). For example, display of certain symbols may trigger a draft feature where a player can select additional and/or alternative virtual football players for their fantasy team. In some embodiments, display of certain symbols may trigger a bonus game wherein credits can be earned (e.g., based on reel game outcomes) and those credits can be spent to add/replace additional and/or alternative virtual football players to the fantasy team. In some embodiments, selections of virtual football players are available based on skillset (e.g., with better and/or more popular virtual football players being available for more points) and/or certain virtual football players may be provided randomly (e.g., during a bonus round). For example, selection of virtual football players that cost more points may provide a better chance of a winning outcome of a game described herein (e.g., better players on a player team may result in higher RTP, while worse players on the player team may result in lower RTP).

As shown in FIG. 5, area 506 illustrates a football roster corresponding to an example fantasy football team (e.g., 1 quarterback (QB), 2 running backs (RB), 2 wide receivers (WR), 1 flex (e.g., an RB, WR, or tight end (TE)), a defense/special teams (D/ST), and a kicker (K), along with a plurality of bench spots). Virtual football players in a starting lineup 510 may affect the football game while virtual football players on a bench 512 may not. In some embodiments, a player may select to move virtual football players between starting lineup 510 and bench 512.

In some embodiments, play at any gaming device associated with a virtual football player may affect fantasy football scores across any number of fantasy football games including that virtual football player and tracked by player tracking server 110. In some embodiments, (e.g., to prevent a virtual football player from earning too many points in the fantasy football games) certain virtual football players may only be selected if they have not already been selected by a predetermined number of other players at other gaming devices.

In some embodiments, a player may select a choice of offense or defense. In some embodiments, a player may be associated with just offense. In some embodiments head-to-head play against other players may be provided. Game outcomes in the virtual football game may be provided based on electronic game outcomes (e.g., slot game outcomes shown in area 502). For example, a pass play in the virtual football game may be provided when a football symbol appears in a first reel of area 502 and a quarterback symbol appears in a fifth reel of area 502. As another example, a field goal attempt may be provided when a football symbol appears in a first reel of area 502 and a field goal symbol appears in a fifth reel of area 502. Play outcomes (e.g., pass play, run play, field goal, etc.) may be randomly determined.

In some embodiments, players may be able to provide inputs to select plays (e.g., selection of run play or pass play, selection of which receiver to throw to, etc.), of which the play outcomes are randomly determined. In some embodiments, certain outcomes may be randomly determined to be replayed (e.g., provided a second time). For example, an instant replay bonus may be provided that causes a previous outcome to be provided again. The game outcome may be replayed in area 502 and virtual football players may be replayed in area 504 as re-performing a play (e.g., scoring another touchdown). Further, portions of the replay bonus (e.g., the virtual football players scoring another touchdown (associated with the previous game outcome being provided again)) may be displayed on a community display visible to patrons, for example, in a gaming establishment (e.g., on different display devices around a casino floor). In other words, display of the replay may be mirrored from the gaming device where the replay bonus was achieved and one or more displays in a gaming establishment to communicate to other patrons that the replay bonus was provided.

In other words, a plurality of virtual football players (e.g., shown in area 506) for an electronic game are identified. A game outcome is then displayed in area 502. Satisfaction of a trigger condition is determined based on the game outcome and a plurality of selectable actions (e.g., selection of run play or pass play, selection of which receiver to throw to, etc.) associated with the plurality of virtual football players are displayed. A selection of a selectable action of the plurality of selectable actions is received and an action outcome associated with the selectable action is randomly determined. At least one virtual football player of the plurality of virtual football players is displayed in area 504 as performing the selectable action in accordance with the action outcome and an output amount is provided to a player account based at least in part upon the action outcome.

For example, two choices for game play are provided (e.g., compete or play basic game). A selected game mode is displayed in area 508 (e.g., compete, as shown in FIG. 5). In basic mode, playing the game shown in area 502 includes a slot game with bonus rounds included. A roster shown in area 506 may be randomly generated and/or a player may select favorite players and/or teams. Slot outcomes in basic mode (e.g., and/or compete mode) may be associated with football plays (e.g., as played out by the virtual football players in area 504) during the spins that advance a team (e.g., the virtual football players shown in lineup 510) on a field shown in area 504 to score touchdowns/field goals.

In compete mode, points during rounds of gameplay in area 502 are provided so that a player can draft virtual football players to build a stronger team in area 506. The compete mode may include a competition with other players at local casino and/or globally through a linked system. For example, a draft bonus round may be provided wherein traditional outputs are provided during spins as well as draft points. Draft points can be spent to select virtual football players from a draft board to better help the team win games in compete mode. Each virtual football player available may have a number of points associated therewith as a cost to add them to the roster shown in area 506.

In some embodiments, certain bonuses may be provided randomly (e.g., providing a bonus may be randomly determined and/or which bonus will be provided may also be randomly determined). As examples, bonuses may include retired football stars being available for selection (e.g., past quarterbacks, running backs, wide receivers, etc.). In some embodiments, the retired football stars may be associated with a better chance of the team scoring. In some embodiments, bonuses include a blocked punt bonus, an extra point field goal bonus, and/or a fumble with random change of possession bonus.

Figure 6:
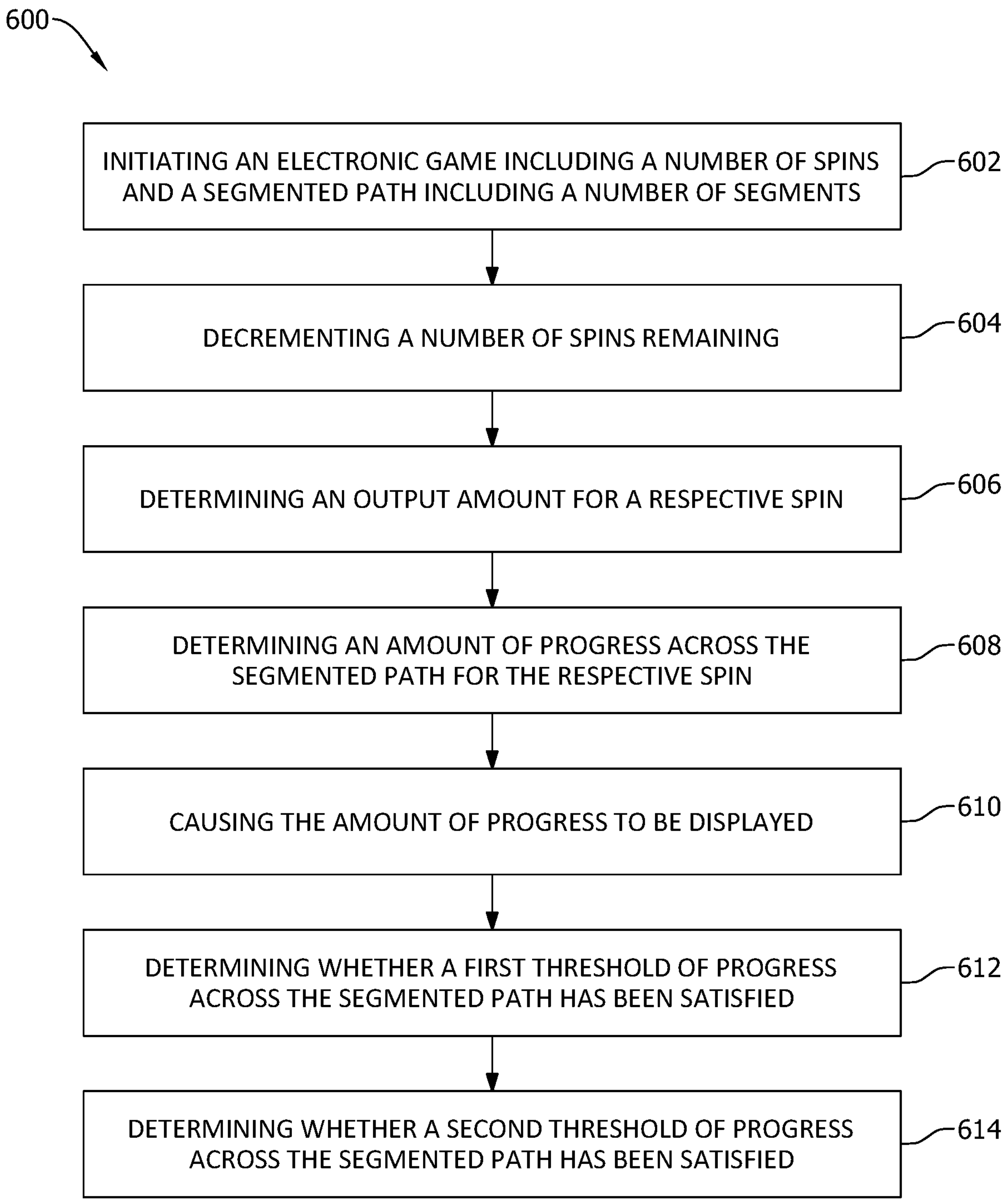
FIG. 6 illustrates an example method of virtual electronic gaming, in accordance with the present disclosure.

FIG. 6 illustrates an example method 600 of virtual electronic gaming, in accordance with the present disclosure. In the example of FIG. 6, method 600 includes initiating 602 an electronic game including a number of spins and a segmented path (e.g., area 404 and/or area 504) including a number of segments (e.g., segments of ten virtual yards) on an electronic gaming device.

Further, for each respective spin of the number of spins, method 600 includes decrementing 604 a number of spins remaining, determining 606 an output amount for the respective spin wherein the output amount (e.g., a credit amount) is associated with any of a first subset of symbols being displayed for the respective spin and wherein each symbol of the first subset of symbols is associated with a number for contribution to the output amount, 608 determining, for the respective spin, an amount of progress across the segmented path (e.g., an amount of virtual yards to advance) displayed by the electronic gaming device wherein the amount of progress is associated with any of a second subset of symbols being displayed for the respective spin and wherein each symbol of the second subset of symbols is associated with at least a portion of progress for contribution to the amount of progress, causing 610 the amount of progress to be displayed (e.g., at area 404 and/or area 504), determining 612 whether a first threshold of progress across the segmented path has been satisfied (e.g., a first down) wherein the first threshold of progress being satisfied causes the number of spins remaining to be reset to the number of spins, and determining 614 whether a second threshold of progress across the segmented path has been satisfied (e.g., a touchdown) wherein the second threshold of progress being satisfied causes a randomly determined bonus output to be presented.

In some embodiments, method 600 includes receiving an input associated with a theme of the electronic game (e.g., selection of a football team), identifying at least one of visual effects or audio effects associated with the theme, and presenting at least a portion of the at least one of the visual effects or the audio effects during the electronic game.

In some embodiments, method 600 includes causing display of a graphic (e.g., $1^{st}$ down, $2^{nd}$ down, etc.) associated with the number of free spins remaining in a display area of the electronic gaming device.

In some embodiments of method 600, the first threshold of progress is associated with completion of a segment of the number of segments and method 600 further includes causing display of a needed amount of progress (e.g., virtual yards to go for a first down) to complete the segment of the number of segments.

In some embodiments, method 600 includes causing display of a plurality of potential advancement options (e.g., football play options such as run or pass) wherein each potential advancement option of the plurality of potential advancement options is associated with a randomly determined amount of progress across the segmented path, receiving a selection of a potential advancement option of the plurality of potential advancement options, and causing the randomly determined amount of progress across the segmented path associated with the selection to be provided.

Figure 7:
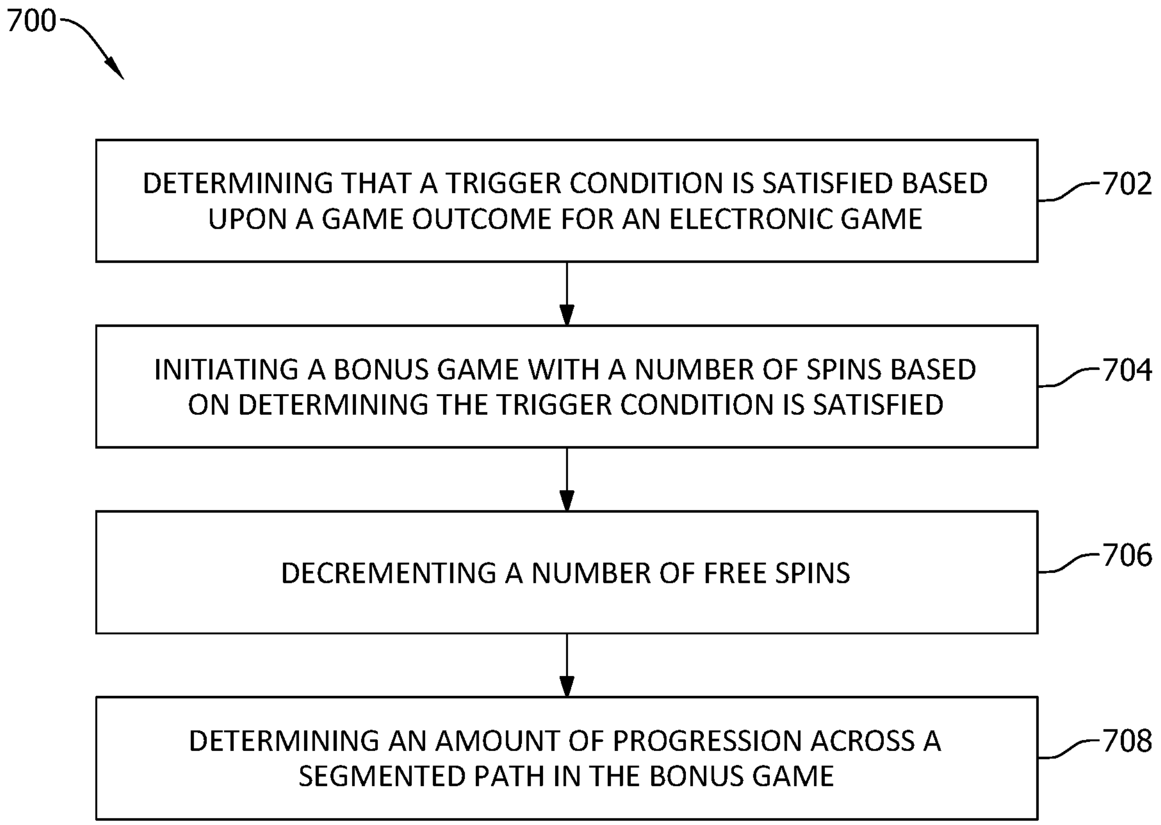
FIG. 7 illustrates another example method of virtual electronic gaming, in accordance with the present disclosure.

FIG. 7 illustrates another example method 700 of virtual electronic gaming, in accordance with the present disclosure.

As shown in FIG. 7, method 700 includes determining 702 that a trigger condition is satisfied based upon a game outcome for an electronic game and initiating 704 a bonus game with a number of spins based on determining the trigger condition is satisfied. Method 700 also includes, for each free spin of the number of free spins, decrementing 706 the number of free spins and determining 708 an amount of progression across a segmented path in the bonus game wherein advancement across at least one segment of the segmented path results in resetting a number of remaining free spins to the number of free spins, and wherein advancement to an end of the segmented path results in an output amount being presented.

Figure 8:
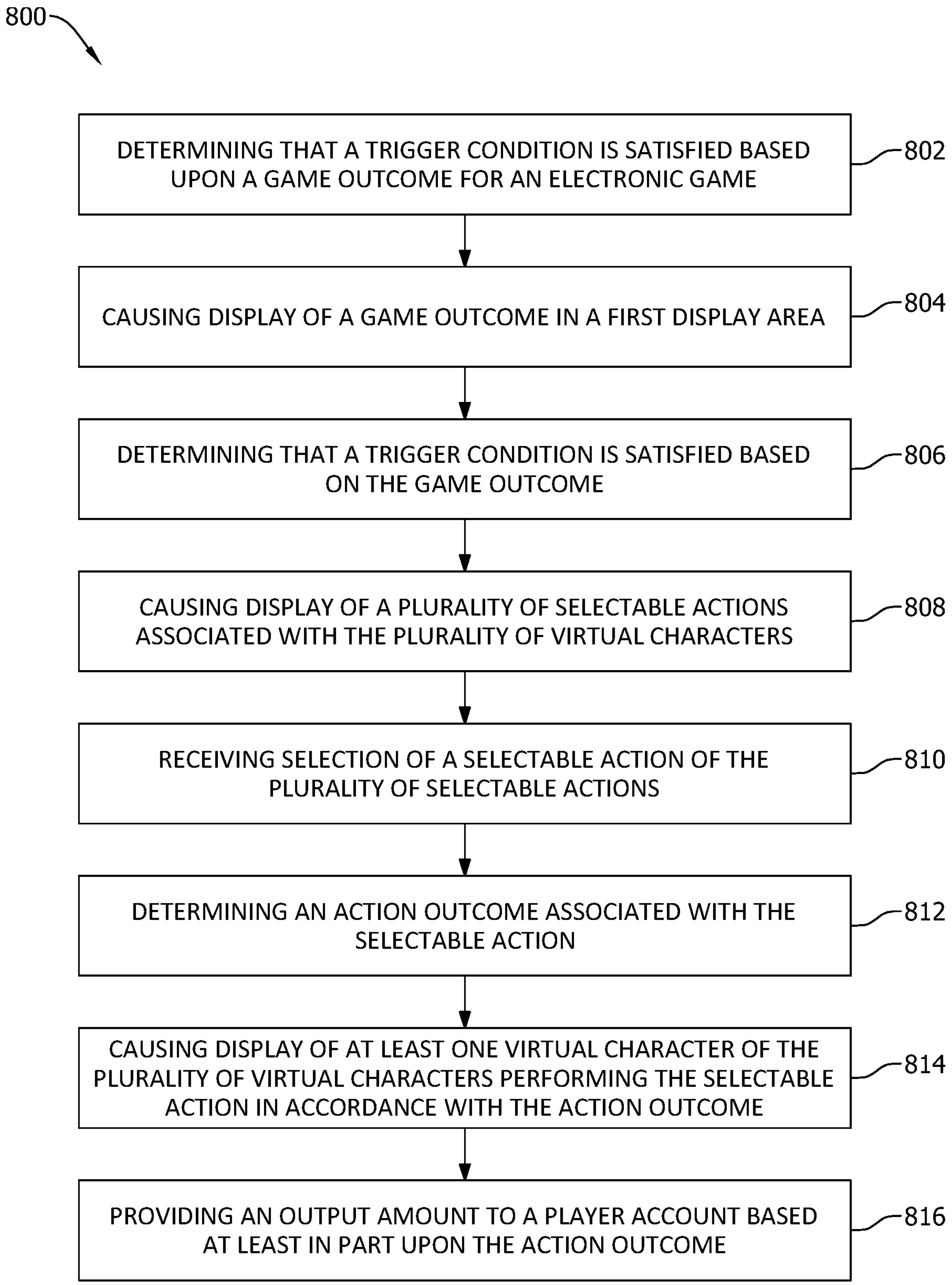
FIG. 8 illustrates another example method of virtual electronic gaming, in accordance with the present disclosure.

FIG. 8 illustrates another example method 800 of virtual electronic gaming, in accordance with the present disclosure.

As shown in FIG. 8, method 800 includes identifying 802 a plurality of virtual characters for an electronic game and causing display 804 of a game outcome in a first display area of a display device. Method 800 also includes determining 806 that a trigger condition is satisfied based on the game outcome, causing display 808 of a plurality of selectable actions associated with the plurality of virtual characters, and receiving 810 selection of a selectable action of the plurality of selectable actions. Method 800 further includes randomly determining 812 an action outcome associated with the selectable action, causing display 814 of at least one virtual character of the plurality of virtual characters performing the selectable action in accordance with the action outcome, and providing 816 an output amount to a player account based at least in part upon the action outcome.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming device comprising:

at least one memory with instructions stored thereon; and at least one processor in communication with the at least one memory, wherein the instructions, when executed by the at least one processor, cause the at least one processor to:

initiate an electronic game including a number of spins and a segmented path including a number of segments; and for each respective spin of the number of spins:

decrement a number of spins remaining;

determine an output amount for the respective spin, wherein the output amount is associated with any of a first subset of symbols being displayed for the respective spin, and wherein each symbol of the first subset of symbols is associated with a number for contribution to the output amount;

determine, for the respective spin, an amount of progress across the segmented path displayed by the electronic gaming device, wherein the amount of progress is associated with any of a second subset of symbols being displayed for the respective spin, and wherein each symbol of the second subset of symbols is associated with at least a portion of progress for contribution to the amount of progress;

cause the amount of progress to be displayed;

determine whether a first threshold of progress across the segmented path has been satisfied, wherein the first threshold of progress being satisfied causes the number of spins remaining to be reset to the number of spins; and determine whether a second threshold of progress across the segmented path has been satisfied, wherein the second threshold of progress being satisfied causes a randomly determined bonus output to be presented.

2. The electronic gaming device of claim 1, wherein the instructions further cause the at least one processor to cause the randomly determined bonus output to be presented, wherein the randomly determined bonus output is eligible to include a feature output that is otherwise ineligible to be presented during the electronic game.

3. The electronic gaming device of claim 2, wherein the instructions further cause the at least one processor to cause display of the randomly determined bonus output as a result of a spin of a bonus wheel that is displayed by the electronic gaming device.

4. The electronic gaming device of claim 1, wherein the second threshold of progress comprises completing the segmented path, and wherein the instructions further cause the at least one processor to randomly determine, upon the second threshold of progress being completed, whether to reset the number of spins remaining to the number of spins and reset progress made on the segmented path.

5. The electronic gaming device of claim 1, wherein the instructions further cause the at least one processor to:

receive an input associated with a theme of the electronic game;

identify at least one of visual effects or audio effects associated with the theme; and present at least a portion of the at least one of the visual effects or the audio effects during the electronic game.

6. The electronic gaming device of claim 1, wherein the instructions further cause the at least one processor to cause display of a graphic associated with the number of free spins remaining in a display area of the electronic gaming device.

7. The electronic gaming device of claim 1, wherein the first threshold of progress is associated with completion of a segment of the number of segments, and wherein the instructions further cause the at least one processor to cause display of a needed amount of progress to complete the segment of the number of segments.

8. The electronic gaming device of claim 1, wherein the instructions further cause the at least one processor to, for at least one spin of the number of spins:

cause display of a plurality of potential advancement options, wherein each potential advancement option of the plurality of potential advancement options is associated with a randomly determined amount of progress across the segmented path;

receive a selection of a potential advancement option of the plurality of potential advancement options; and cause the randomly determined amount of progress across the segmented path associated with the selection to be provided.

9. At least one non-transitory computer-readable storage medium with instructions stored thereon that, in response to execution by at least one processor, cause the at least one processor to:

cause an electronic game including a number of spins and a segmented path including a number of segments to be initiated on an electronic gaming device; and for each respective spin of the number of spins:

cause a number of spins remaining to be decremented;

determine an output amount for the respective spin, wherein the output amount is associated with any of a first subset of symbols being displayed for the respective spin, and wherein each symbol of the first subset of symbols is associated with a number for contribution to the output amount;

determine, for the respective spin, an amount of progress across the segmented path displayed by the electronic gaming device, wherein the amount of progress is associated with any of a second subset of symbols being displayed for the respective spin, and wherein each symbol of the second subset of symbols is associated with at least a portion of progress for contribution to the amount of progress;

cause the amount of progress to be displayed;

determine whether a first threshold of progress across the segmented path has been satisfied, wherein the first threshold of progress being satisfied causes the number of spins remaining to be reset to the number of spins; and determine whether a second threshold of progress across the segmented path has been satisfied, wherein the second threshold of progress being satisfied causes a randomly determined bonus output to be presented.

10. The at least one non-transitory computer-readable storage medium of claim 9, wherein the instructions further cause the at least one processor to cause the randomly determined bonus output to be presented, wherein the randomly determined bonus output is eligible to include a feature output that is otherwise ineligible to be presented during the electronic game.

11. The at least one non-transitory computer-readable storage medium of claim 9, wherein the instructions further cause the at least one processor to randomly determine, upon the second threshold of progress being completed, whether to reset the number of spins remaining to the number of spins and reset progress made on the segmented path.

12. The at least one non-transitory computer-readable storage medium of claim 9, wherein the instructions further cause the at least one processor to:

receive an input associated with a theme of the electronic game;

identify at least one of visual effects or audio effects associated with the theme; and cause at least a portion of the at least one of the visual effects or the audio effects to be presented at the electronic gaming device during the electronic game.

13. The at least one non-transitory computer-readable storage medium of claim 9, wherein the instructions further cause the at least one processor to:

receive a selection of a potential advancement option of a plurality of potential advancement options, wherein each potential advancement option of the plurality of potential advancement options is associated with a randomly determined amount of progress across the segmented path; and cause the randomly determined amount of progress across the segmented path associated with the selection to be provided.

14. The at least one non-transitory computer-readable storage medium of claim 9, wherein the instructions further cause the at least one processor to cause the electronic game to be initiated by transmitting at least one message to the electronic gaming device.

15. The at least one non-transitory computer-readable storage medium of claim 9, wherein the instructions further cause the at least one processor to:

determine a game outcome for the electronic game; and transmit at least one message associated with the game outcome to the electronic gaming device, wherein the game outcome is associated with the output amount, and wherein the electronic gaming device, upon receipt of the at least one message, is configured to display the output amount and the amount of progress.

16. A method of electronic gaming implemented by at least one processor in communication with at least one memory, the method comprising:

initiating an electronic game including a number of spins and a segmented path including a number of segments on an electronic gaming device; and for each respective spin of the number of spins:

decrementing a number of spins remaining;

determining an output amount for the respective spin, wherein the output amount is associated with any of a first subset of symbols being displayed for the respective spin, and wherein each symbol of the first subset of symbols is associated with a number for contribution to the output amount;

determining, for the respective spin, an amount of progress across the segmented path displayed by the electronic gaming device, wherein the amount of progress is associated with any of a second subset of symbols being displayed for the respective spin, and wherein each symbol of the second subset of symbols is associated with at least a portion of progress for contribution to the amount of progress;

causing the amount of progress to be displayed;

determining whether a first threshold of progress across the segmented path has been satisfied, wherein the first threshold of progress being satisfied causes the number of spins remaining to be reset to the number of spins; and determining whether a second threshold of progress across the segmented path has been satisfied, wherein the second threshold of progress being satisfied causes a randomly determined bonus output to be presented.

17. The method of claim 16, further comprising:

receiving an input associated with a theme of the electronic game;

identifying at least one of visual effects or audio effects associated with the theme; and presenting at least a portion of the at least one of the visual effects or the audio effects during the electronic game.

18. The method of claim 16, further comprising causing display of a graphic associated with the number of free spins remaining in a display area of the electronic gaming device.

19. The method of claim 16, wherein the first threshold of progress is associated with completion of a segment of the number of segments, and wherein the method further comprises causing display of a needed amount of progress to complete the segment of the number of segments.

20. The method of claim 16, further comprising:

causing display of a plurality of potential advancement options, wherein each potential advancement option of the plurality of potential advancement options is associated with a randomly determined amount of progress across the segmented path;

receiving a selection of a potential advancement option of the plurality of potential advancement options; and causing the randomly determined amount of progress across the segmented path associated with the selection to be provided.

* * * * *